June 17, 1947. T. W. STEINKE 2,422,266

METHOD OF MAKING POWER TRANSMISSION BELTS

Filed May 11, 1946

INVENTOR.
THEODORE W. STEINKE
BY
ATTORNEY

Patented June 17, 1947

2,422,266

UNITED STATES PATENT OFFICE 2,422,266

METHOD OF MAKING POWER-TRANSMISSION BELTS

Theodore W. Steinke, Denver, Colo., assignor to The Gates Rubber Company, Denver, Colo., a corporation of Colorado Application May 11, 1946, Serial No. 669,147

2 Claims. (Cl. 18—59)

This invention relates to improvements in methods of making endless power transmission belts.

Belts of the V-type have normally been made by building up the material on a drum and transferring the belt to a rag wrapped type mold for the purpose of curing the same.

It is becoming increasingly popular to employ for the tension element of belts of the type mentioned, stranded wires which should preferably be under some tension when the belt is cured. Experience has shown that considerable difficulty is experienced in maintaining the position of the stranded wire cables and their straightness in the finished belt when the belts are cured in the ordinary rag wrapped type mold and the practice has therefore been to semi-cure the under cord of the belt, flip a band on this semi-cured section and finish curing in a normal mold.

The belt that forms the subject of this invention, is constructed in a manner which will hereinafter be described in detail, but which, briefly described, consists in positioning the wire tension elements and an outer layer of rubberized material in a closed cavity after which the under core or belt body is transferred by the transfer molding process to the inside of the core section. By this method the belt is cured with the wires under considerable tension, built up by the transfer molding. A relatively short semi-cure is sufficient and the core of the belt is in the exact shape and position after being removed from the mold. The core with the transferred under body, which has been semi-cured, is then flipped with a band and cured in a normal mold.

Having thus briefly described the invention and some of the objects and advantages thereof, it will now be described in greater detail and for this purpose reference will be had to the accompanying drawing in which.

Figure 1:
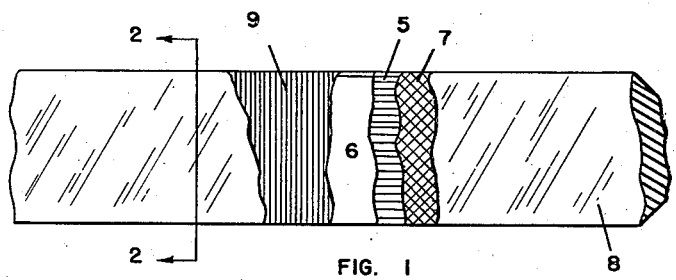
Figure 1 is a top plan view of a belt constructed in accordance with this invention, portions having been broken away to better disclose the construction.
Figure 2:
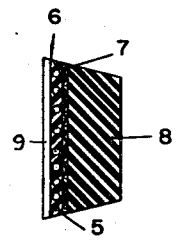
Figure 2 is a section taken on line 2—2, Figure 1.

Referring now to Figures 1 and 2, reference numeral 5 designates a layer of stranded metal cables which constitute the tension element. Reference numeral 6 designates an outer layer of rubber composition in which the cables are embedded, reference numeral 7 designates a layer of fibrous material, such as rubberized woven fabric or cord fabric. The body of the belt, which has been designated by reference numeral 8, is formed from rubber composition either free from fibers or mixed with fibers and reference numeral 9 designates an outer cord fabric covering in which the cords extend transversely of the longitudinal axis of the belt.

Figure 3:
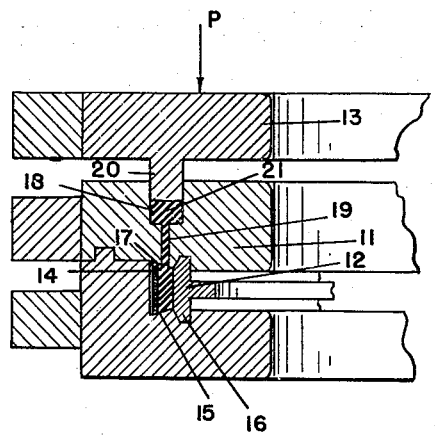
Figure 3 is a radial section taken through the transfer mold employed in this method.
Figure 4:
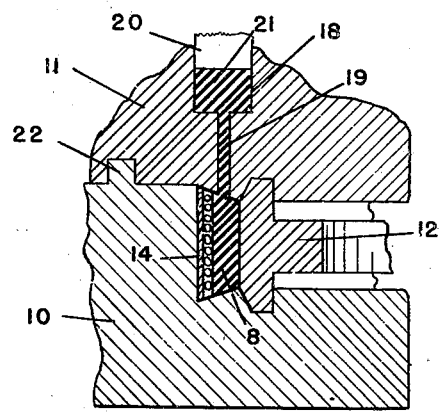
Figure 4 is a fragmentary section similar to that shown in Figure 3, but to an enlarged scale.

The mold employed for making this belt has been illustrated in section in Figures 3 and 4 and consists of a bottom mold 10, a top mold 11, a removable mold ring 12 and a plunger ring 13. The mold consists of the several parts identified above. The several mold elements are annular, a single section taken on a radial line has been shown. The diameter of the mold sections depends upon the length of belt to be constructed and various sizes may also be provided for various sized belts. Mold ring 10 has a cylindrical wall 14 that extends downwardly to a distance equal to the width of the outer surface of the belt. Extending upwardly and inwardly at an angle is a wall 15 that determines the position and angular relation of the side wall. The removable ring 12 has tapered flanges 16 that fit into correspondingly shaped grooves in the upper surface of mold member 10 and the under surface of mold member 11. An inclined surface 17 forms the mold surface for the upper side wall of the belt. The upper surface of mold ring 11 is provided with an annular groove 18 which is in communication with the belt mold through one or more holes 19. Mold member 13 constitutes a plunger and has an annular flange 20 that fits into groove 18 and serves as a piston for forcing the rubber composition, which has been designated by reference numeral 21, into the mold cavity. In the manufacture of a belt, a layer of tension elements, such as the stranded wire cables 5, are arranged in a flat ring and preferably secured to the inner surface of a cord fabric strip 9 by the rubber composition 6. The cables are assembled by winding them on a drum of such diameter that they will be put under tension when forced outwardly against the mold side 14 by the pressure of the injected rubber composition.

After the tension layer has been positioned in the mold cavity adjacent the outer wall thereof and the mold closed, groove 18 is partly filled with the rubber composition 21 and the plunger ring positioned with flange 20 extending into the upper end of groove 18. One or more holes 19 are provided between groove 18 and the mold cavity and when sufficient pressure is applied in the direction of P the rubber composition material will be forced through the communicating holes into the mold cavity and, since this material is introduced between the inner surface of the tension elements and the outer surface of mold ring 12, the pressure exerted will tend to expand the tension element core, thereby putting the cables under tensional strain. After the mold has been completely filled, the parts are subjected to a semi-cure, whereupon the mold is opened and the belt removed, and subjected to such further treatment as may be found desirable.

If desired a layer of cord or bias cut woven fabric 7 can be positioned against the inner surfaces of the tension cables before the body material 8 is introduced by the injection arrangement illustrated. It is to be understood, however, that the use of the fabric layer 7 is optional. The method described above makes it possible to mold a belt of the proper shape and dimensions and at the same time put the tension elements 5 under whatever initial tensional strain may be desired.

The mold is preferably heated to a temperature of about 320 degrees Fahrenheit and maintained at a temperature in this vicinity during the molding operation.

If a single hole 19 is employed, the pump for injecting the material may be modified and instead of using an annular cylinder 18 and an annular piston 20 any other construction of injection pump may be used.

In the above parts of the specification, the body 8, as well as other parts, is described as made from "rubber composition." This term is used in a sense in which it includes both natural and the so-called synthetic rubbers as well as any mechanical equivalent thereof such as plastics having similar properties.

The tension core is preferably formed from stranded metal wires, or cables, but may be formed from cotton cords, rayon cords, synthetic fibers or any other suitable material.

When the tension cords are made from fiber, such as cotton or rayon, it is necessary to make it of such length that the tension layer will be under some tension when the mold has been filled. When metal cables are used, the tension layer is made of such length that it fits against the outer wall of the mold quite snugly with only enough differential to assure that the wire cables will be straight.

The mould cavity and cooperating parts are preferably circular but may have any other suitable shape.

Having described the invention what is claimed as new is:

1. The method of forming an endless power transmission belt by means of a mold having an endless mold cavity of the desired belt cross section whose width is defined by spaced outer and inner walls, which comprises the steps of positioning in the mold cavity, adjacent the outer wall thereof, a readily flexible tension ring assembly, formed in part of a layer of flexible cables, of less thickness than the distance between the inner and outer walls of the mold cavity, the peripheral length of the tension ring being slightly less than the length of the outer wall of the mold cavity, injecting under pressure a curable rubber composition into the space between the tension ring and the inner wall of the mold cavity, at a plurality of spaced points, thereby forcing the tension ring outwardly against the outside wall of the mold cavity, and subjecting the belt to a curing treatment while in the mold.

2. The method of forming an endless power transmission belt by means of a mold having an endless mold cavity of the desired belt cross section, whose width is defined by spaced inner and outer walls, which comprises the steps of positioning in the mold cavity, adjacent the outer wall thereof, a readily flexible tension ring assembly, formed in part of a layer of flexible cables, of less thickness than the distance between the inner and outer walls of the mold cavity, the peripheral length of the tension ring being slightly less than the length of the outer wall of the mold cavity, injecting under pressure a curable rubber composition into the space between the tension ring and the inner wall of the mold cavity, thereby forcing the tension ring outwardly against the outside wall of the mold cavity, and subjecting the belt to a curing treatment while in the mold.

THEODORE W. STEINKE.

REFERENCES CITED

The following references are of record in the file of this patent:

UNITED STATES PATENTS

| Number | Name | Date |
| --- | --- | --- |
| 1,745,482 | Goodwin | Feb. 4, 1930 |
| 1,939,894 | Goodwin | Dec. 19, 1933 |
| 2,135,380 | Benge | Nov. 1, 1938 |
| 2,131,319 | Greenholtz et al. | Sept. 27, 1938 |
| 1,354,738 | Gates | Oct. 5, 1920 |
| 1,969,067 | Freeman | Aug. 7, 1934 |
| 1,510,449 | Brucker | Sept. 30, 1924 |
| 2,292,290 | Robins | Aug. 4, 1942 |
| 2,239,635 | Walton | Apr. 22, 1941 |